United States Patent
Mermoud et al.

(10) Patent No.: US 10,212,044 B2
(45) Date of Patent: Feb. 19, 2019

(54) SPARSE CODING OF HIDDEN STATES FOR EXPLANATORY PURPOSES

(71) Applicant: Cisco Technology, Inc., San Jose, CA (US)

(72) Inventors: Grégory Mermoud, Veyras (CH); Pierre-André Savalle, Rueil-Malmaison (FR); Jean-Philippe Vasseur, Saint Martin d'uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 15/466,969

(22) Filed: Mar. 23, 2017

(65) Prior Publication Data

US 2018/0278487 A1  Sep. 27, 2018

(51) Int. Cl.
| | |
|---|---|
| G06F 15/16 | (2006.01) |
| H04L 12/24 | (2006.01) |
| G06N 3/08 | (2006.01) |
| G06N 3/04 | (2006.01) |
| H04L 29/06 | (2006.01) |
| H04L 29/08 | (2006.01) |
| H04N 7/16 | (2011.01) |

(52) U.S. Cl.
CPC .......... *H04L 41/16* (2013.01); *G06N 3/0445* (2013.01); *G06N 3/08* (2013.01); *H04L 29/06* (2013.01); *H04L 67/10* (2013.01); *H04N 7/163* (2013.01)

(58) Field of Classification Search
CPC ... H04L 29/08072; H04L 29/06; H04N 7/163; H04N 5/913

USPC ............... 709/203, 220, 224, 226, 228, 232
See application file for complete search history.

(56) References Cited

U.S. PATENT DOCUMENTS

| | | | | |
|---|---|---|---|---|
| 6,327,550 | B1 * | 12/2001 | Vinberg .............. | G06F 11/3006 700/48 |
| 6,640,145 | B2 * | 10/2003 | Hoffberg ............ | G05B 19/0426 700/17 |
| 6,850,252 | B1 * | 2/2005 | Hoffberg ............ | G06K 9/00369 348/E7.061 |

(Continued)

OTHER PUBLICATIONS

Faruqui et al. "Sparse Overcomplete Word Vector Representations", 10 pages, 2015, arXiv:1506.02004, arxiv.org.

(Continued)

*Primary Examiner* — Khanh Q Dinh
(74) *Attorney, Agent, or Firm* — Parker Ibrahim & Berg LLP; James M. Behmke; Stephen D. LeBarron (57) ABSTRACT

In one embodiment, a device in a network maintains a machine learning-based recursive model that models a time series of observations regarding a monitored entity in the network. The device applies sparse dictionary learning to the recursive model, to find a decomposition of a particular state vector of the recursive model. The decomposition of the particular state vector comprises a plurality of basis vectors. The device determines a mapping between at least one of the plurality of basis vectors for the particular state vector and one or more human-readable interpretations of the basis vectors. The device provides a label for the particular state vector to a user interface. The label is based on the mapping between the at least one of the plurality of basis vectors for the particular state vector and the one or more human-readable interpretations of the basis vectors.

18 Claims, 6 Drawing Sheets

(56) References Cited

U.S. PATENT DOCUMENTS

| | | | | |
|---|---|---|---|---|
| 7,966,078 B2* | 6/2011 | Hoffberg | ............... | G05B 15/02 370/200 |
| 8,209,269 B2* | 6/2012 | Schoelkopf | .......... | G06K 9/6215 706/12 |
| 10,007,884 B2* | 6/2018 | Alboszta | ............. | G06N 99/002 |
| 2006/0155398 A1* | 7/2006 | Hoffberg | ............... | G05B 15/02 700/86 |
| 2014/0173452 A1* | 6/2014 | Hoffberg | ............... | G05B 15/02 715/744 |
| 2014/0272914 A1 | 9/2014 | Baraniuk et al. | | |

OTHER PUBLICATIONS

Kim, Been "Interactive and Interpretable Machine Learning Models for Human Machine Collaboration", Department of Aeronautics and Astronautics, Jun. 2015, 143 pages, Massachusetts Institute of Technology.

Lei et al. "Rationalizing Neural Predictions", 2016, 11 pages, arXiv:1606.04155, arxiv.org.

Ribeiro et al. "Nothing Else Matters: Model-Agnostic Explanations by Identifying Prediction Invariance", 30th Conference on Neural Information Processing Systems (NIPS 2016), Barcelona, Spain., 5 pages, Nov. 17, 2016, arXiv.

Ribeiro, Marco Tulio. "LIME—Local Interpretable Model-Agnostic Explanations", https://homes.cs.washington.edu/~marcotcr/blog/lime/, 7 pages, Apr. 2, 2016, University of Washington.

Wisdom, et al. "Interpretable Recurrent Neural Networks Using Sequential Sparse Recovery", 30th Conference on Neural Information Processing Systems (NIPS 2016), Barcelona, Spain, arXiv:1611.07252v1, 11 pages, Nov. 22, 2016, arxiv.org.

* cited by examiner

SPARSE CODING OF HIDDEN STATES FOR EXPLANATORY PURPOSES

TECHNICAL FIELD

The present disclosure relates generally to computer networks, and, more particularly, to the sparse coding of hidden states for explanatory purposes in a network.

BACKGROUND

Many network assurance systems rely on predefined rules to determine the health of the network. In turn, these rules can be used to trigger corrective measures and/or notify a network administrator as to the health of the network. For instance, in an assurance system for a wireless network, one rule may comprise a defined threshold for what is considered as an acceptable number of clients per access point (AP) or the channel interference, itself. More complex rules may also be created to capture conditions over time, such as a number of events in a given time window or rates of variation of metrics (e.g., the client count, channel utilization, etc.).

In contrast to using predefined health status rules, a promising new area of interest with respect to network assurance systems is the use of machine learning to evaluate, predict, and diagnose the health status of a subject network. Notably, Deep Neural Networks (DNNs) often achieve impressive predictive accuracy, but they lack the explanatory power that is needed in industrial applications. This is particularly true when trying to use Recurrent Neural Networks (RNNs) to capture the dynamics of network elements (e.g., routers, switches, controllers, access points) and exploiting the hidden state information to distinguish different classes of behavior. In this case, the dimensions of the state space are most often uninterpretable without ad hoc mechanisms.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network maintains a machine learning-based recursive model that models a time series of observations regarding a monitored entity in the network. The device applies sparse dictionary learning to the recursive model, to find a decomposition of a particular state vector of the recursive model. The decomposition of the particular state vector comprises a plurality of basis vectors. The device determines a mapping between at least one of the plurality of basis vectors for the particular state vector and one or more human-readable interpretations of the basis vectors. The device provides a label for the particular state vector to a user interface. The label is based on the mapping between the at least one of the plurality of basis vectors for the particular state vector and the one or more human-readable interpretations of the basis vectors.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
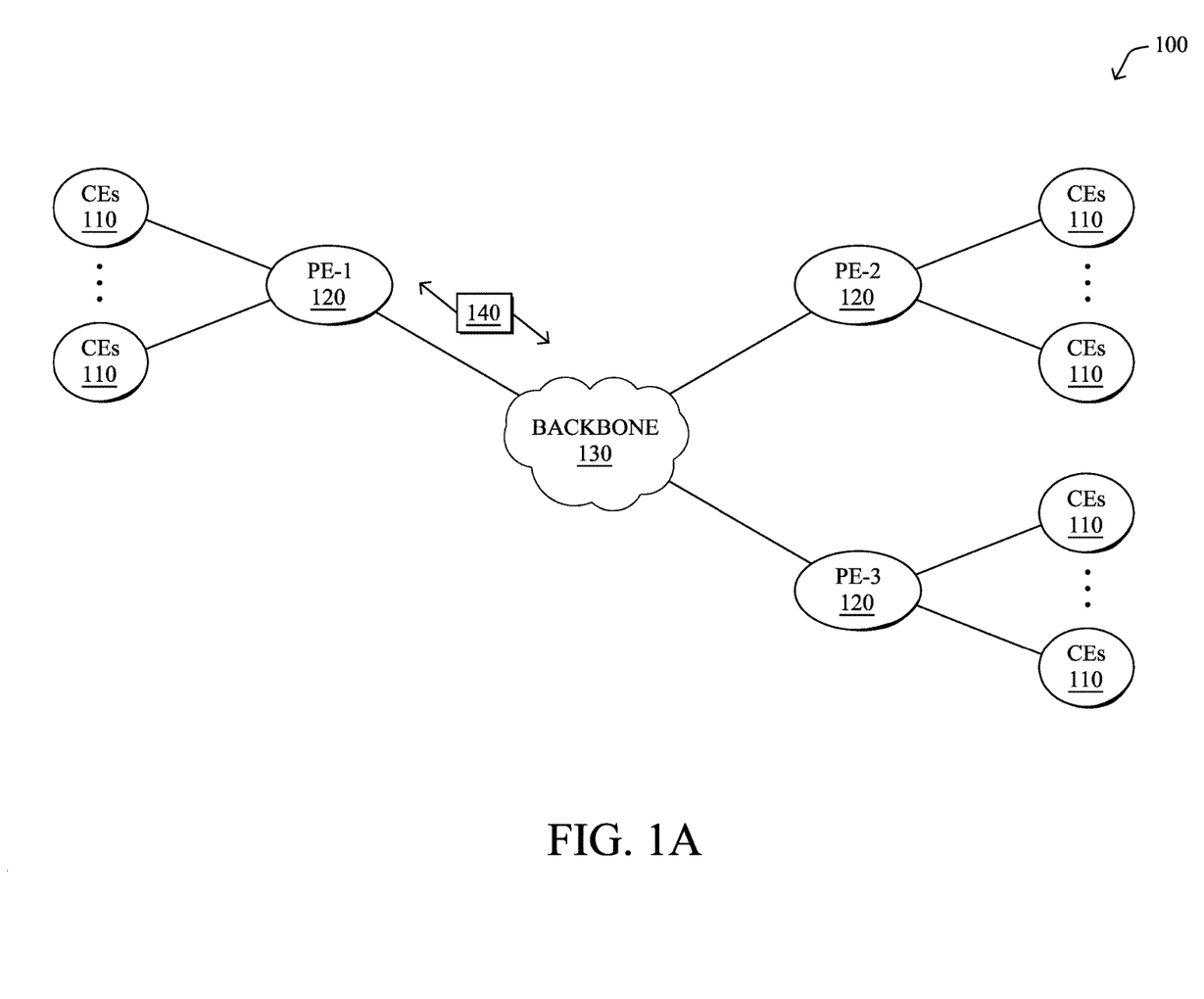
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
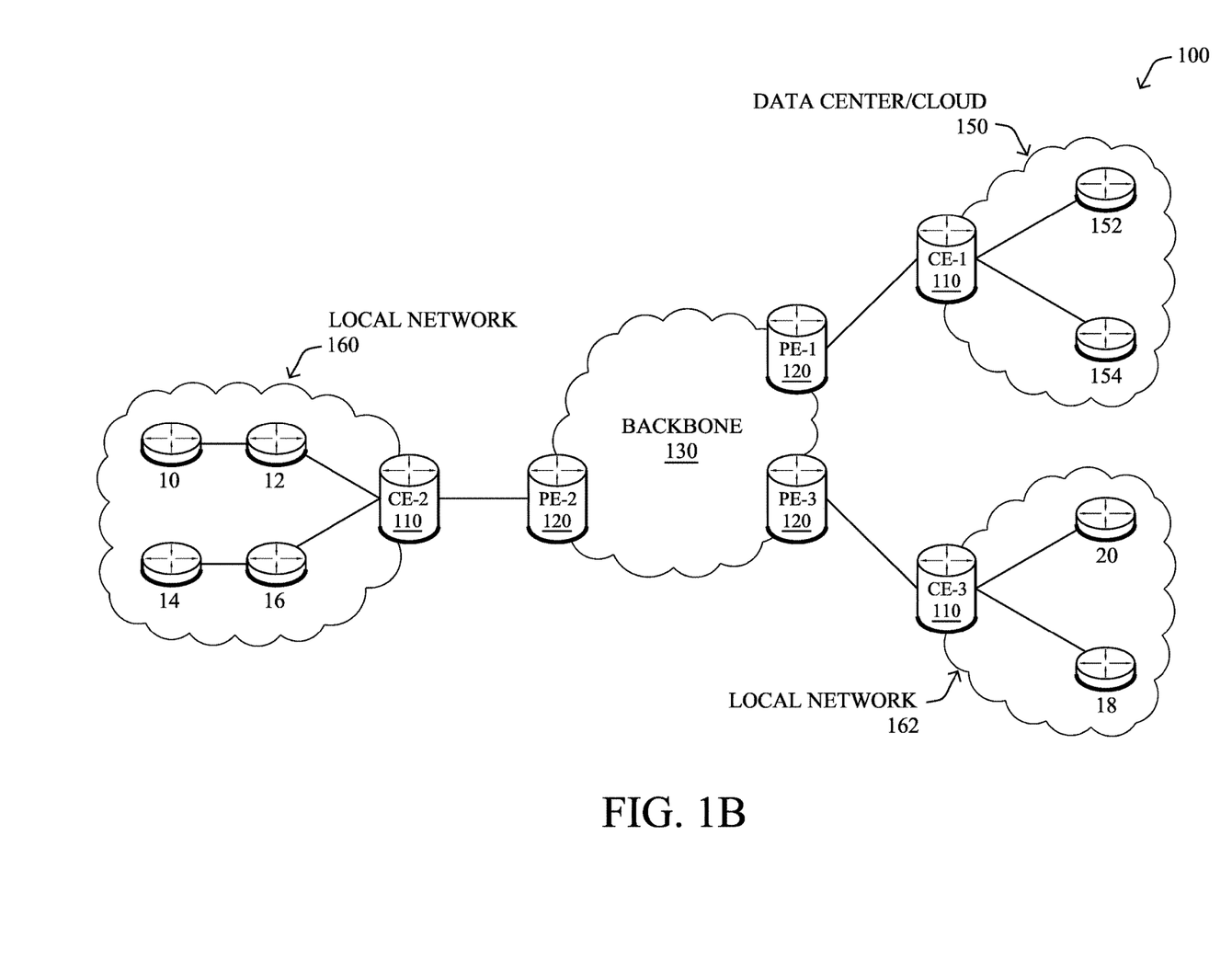

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
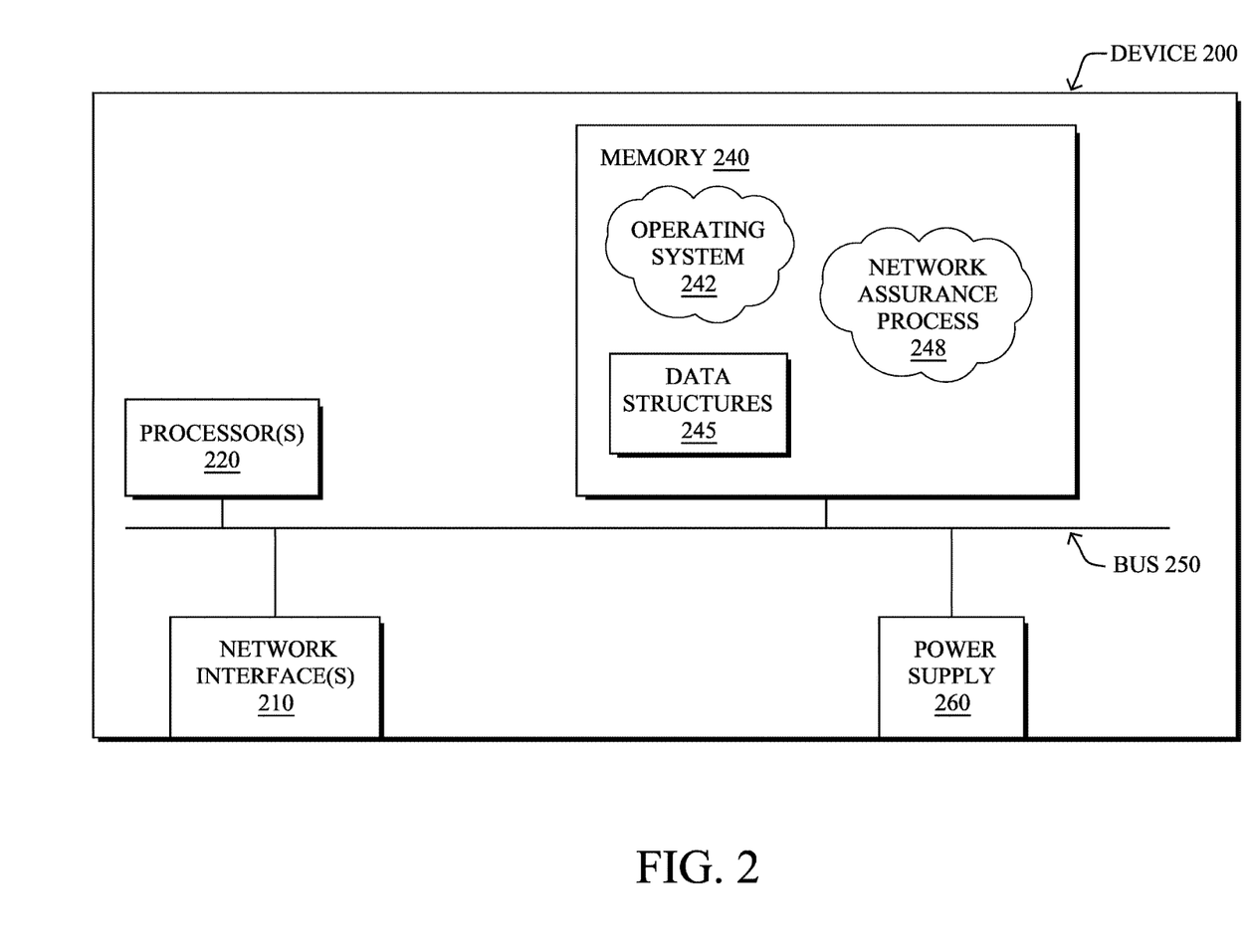
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), deep learning techniques that may use recursive models such as recurrent neural networks (RNNs), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted poor performance in the network. Conversely, the false negatives of the model may refer to the number of times the model predicted good performance when, in fact, poor performance was. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
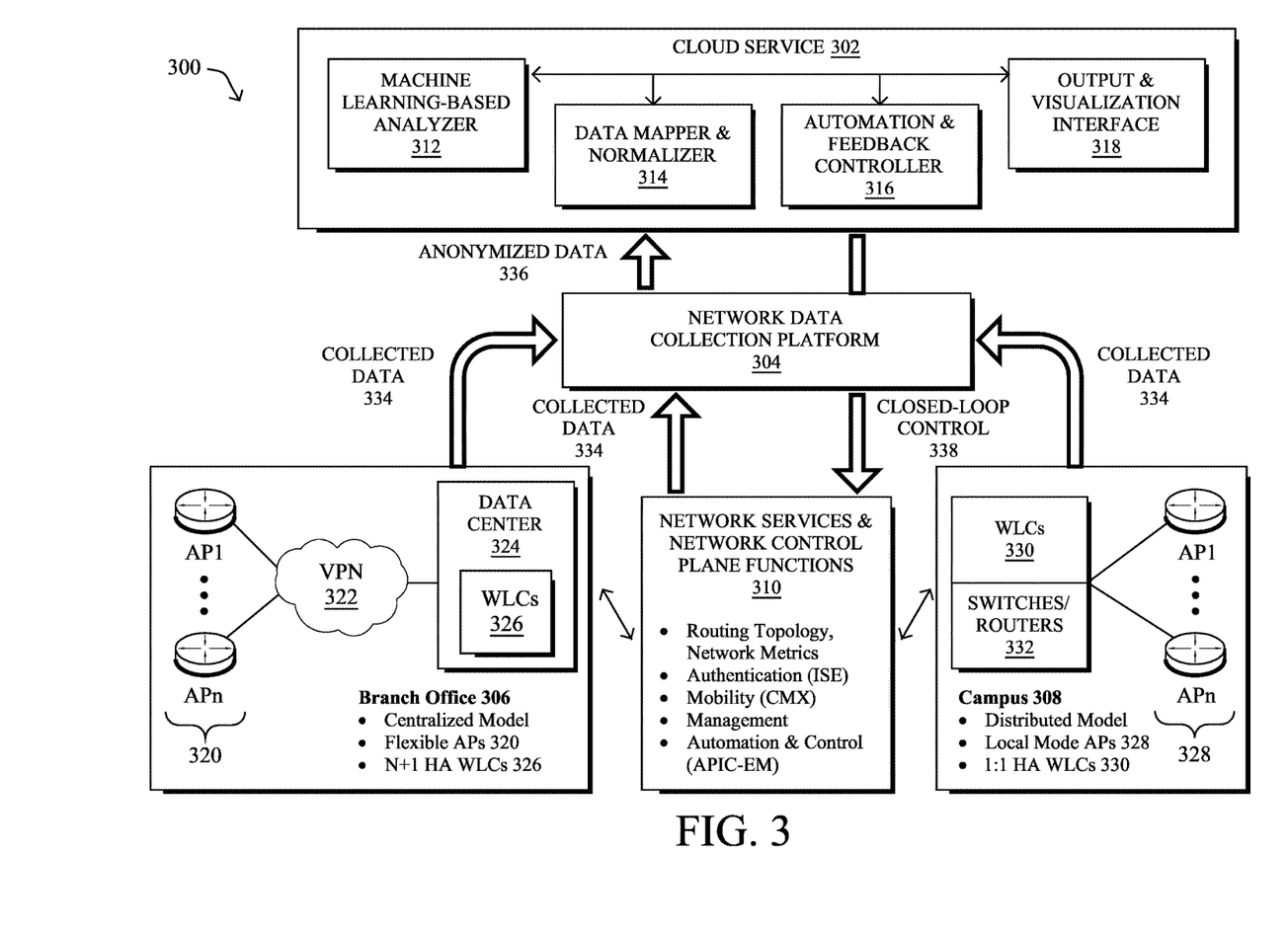
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and the like. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, machine learning presents a significant advancement over the use of static health status rules in a network assurance system. Notably, deep learning techniques are able to model high levels of abstraction from the observations regarding the network (e.g., collected data 334). In other words, deep learning can find abstract relationships between different observations through the use of multiple hidden layers (e.g., abstractions) that separate the input observations from the output layer of the model. However, because this state information is hidden by nature, these approaches lack the explanatory power of traditional rule-based approaches. This is particularly true when trying to use recursive approaches, such as RNNs, to capture the dynamics of network entities (e.g., hosts, routers, switches, controllers, APs, etc.) and exploit the hidden state information to distinguish different classes of behavior. In this case, the dimensions of the state space are most often uninterpretable without ad hoc mechanisms.

For example, consider the case in which a network administrator is notified that a particular AP is performing poorly. There may be any number of observable characteristics associated with the AP that a network assurance system may capture and assess, to identify the condition and determine why the AP is performing poorly. In a rule-based approach, the administrator can easily interpret and diagnose the contributing factors by simply reviewing any violated rules associated with the AP (e.g., one rule may trigger if the number of attached clients exceeds fifty endpoints and the associated bandwidth for the AP is below a given threshold). However, this requires the administrator to have foreknowledge of the relationships between these characteristics/observations, in order to first define the rule(s).

Using a machine learning-based approach to assess the same scenario above, the system may consider a set of observations regarding the AP with very high dimensionality (e.g., all observable characteristics associated with the AP), to predict whether the AP will perform poorly. From the standpoint of the administrator, it may be useful to know that the AP is predicted to perform poorly in view of the network observations, but exactly which combinations of conditions/observations that actually contributed to this finding will remain hidden from the administrator due to the nature of this approach.

Sparse Coding of Hidden States for Explanatory Purposes

The techniques herein leverage a combination of time series modeling (e.g., RNNs or other recursive models), sparse coding, and/or active learning, in order to determine descriptions for some basic behaviors that can be provided to a user interface for review by an administrator. For example, these descriptions may be displayed as simple time series plots. These descriptions can then be used to qualify more complex behaviors that cannot be easily interpreted from the dynamics of their properties. Said differently, the techniques herein can be used to generate a label for a given state vector of a model for a network entity that is based on human-readable interpretations of the data.

Specifically, according to one or more embodiments of the disclosure as described in detail below, a device in a network maintains a machine learning-based recursive model that models a time series of observations regarding a monitored entity in the network. The device applies sparse dictionary learning to the recursive model, to find a decomposition of a particular state vector of the recursive model. The decomposition of the particular state vector comprises a plurality of basis vectors. The device determines a mapping between at least one of the plurality of basis vectors for the particular state vector and one or more human-readable interpretations of the basis vectors. The device provides a label for the particular state vector to a user interface. The label is based on the mapping between the at least one of the plurality of basis vectors for the particular state vector and the one or more human-readable interpretations of the basis vectors.

Illustratively, the techniques described herein may be performed by hardware, software, and/or firmware, such as in accordance with process 248, which may include computer executable instructions executed by the processor 220 (or independent processor of interfaces 210).

Operationally, an example architecture 400 for performing sparse coding of hidden states for explanatory purposes is shown, according to various embodiments. In general, architecture 400 may be implemented and executed by one or more devices (e.g., a device 200) as part of a network assurance process (e.g., process 248) and as part of a network assurance system (e.g., system 300) that monitors and oversees a given network. For example, the components/device of cloud service 302 in FIG. 3 may implement architecture 400, to perform the techniques described herein. As would be appreciated, the sub-processes and/or memory locations shown in FIG. 4 may be located on the same device or implemented in a distributed manner across multiple devices, the combination of which may be viewed as a single system/device. Further, while certain functionalities are described with respect to the sub-processes and memory locations, these functions can be added, removed, or combined as desire, in further implementations.

Figure 4:
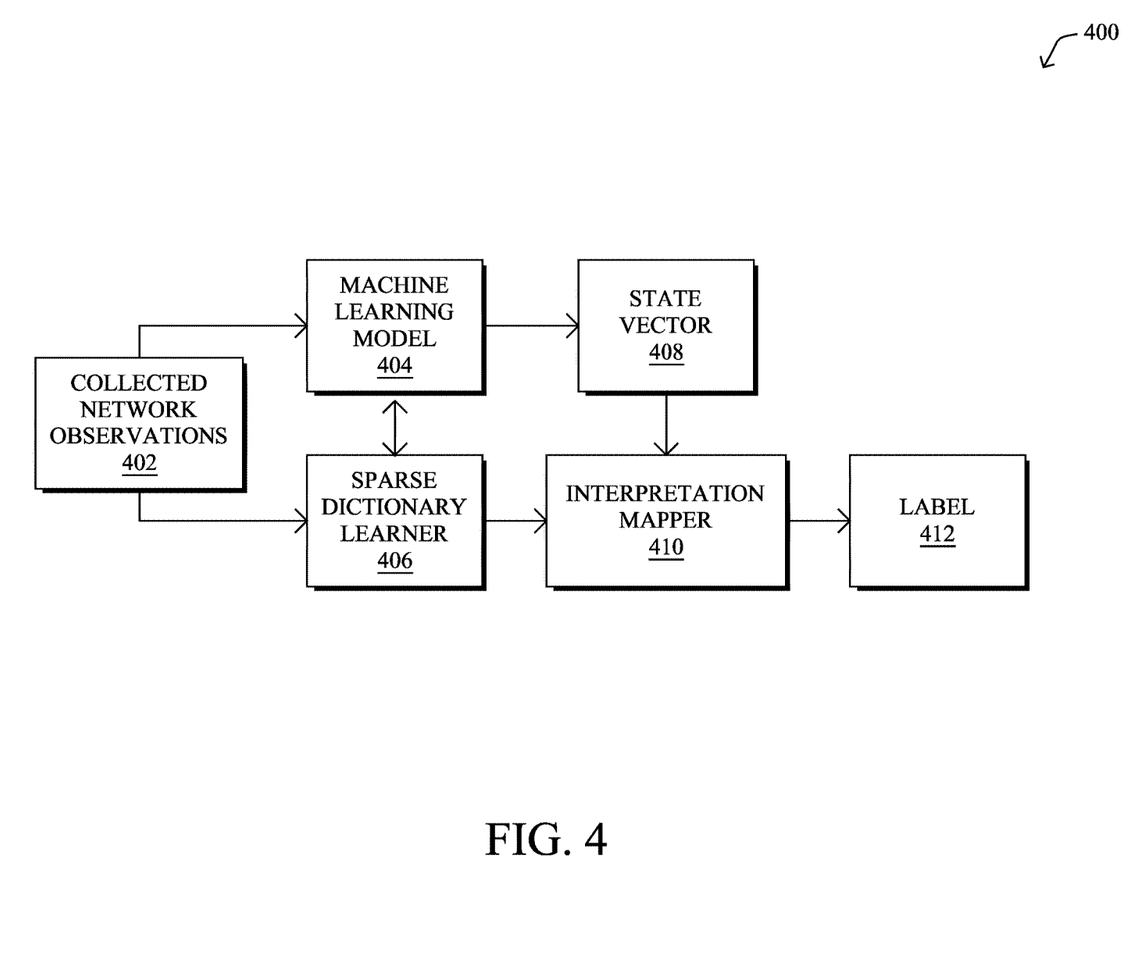
FIG. 4 illustrates an example architecture for performing sparse coding of hidden states for explanatory purposes.

In some embodiments, a first component of architecture 400 is a machine learning model 404 trained to represent a given entity in the network in what is referred to herein in as an "embedded space." For example, model 404 may model a router, switch, AP (e.g., a Wi-Fi AP, etc.), controller, endpoint, or the like, based on collected network observations 402 regarding the entity. As would be appreciated, the number and types of collected network observations 402 used by model 404 may differ depending on the type and location of the entity in the network.

Captured network observations 402 may comprise static feature vectors of observations (e.g., an observed performance metric, etc.) and/or one or more time series of observations (e.g., bandwidth consumption over time, etc.). In both cases, machine learning model 404 may receive as input a large set of observations 402 that are interpretable.

Example types of machine learning model 404 may include an RNN or similar recursive model that can be used to model time series of observations 402, and project those into an embedded space. As noted previously, an RNN has the property of "maintaining" an internal state that captures the dynamics of the entity. In other words, these types of models depend on the current properties (e.g., noise, interference, client count, etc.) of the entity, as well as how they evolved in the past. In addition, RNNs are generative models meaning that one can pick a state and use the RNN to generate the "typical" evolution of its properties. Dimensions, or combination thereof, of the hidden state space may or may not have an interpretable meaning, but no mechanism in a typical RNNs actually provide this meaning.

For static feature vectors, other embedding techniques can be used by model 404, including directly using interpretable features as-is for each entity. However, in the latter case, the input feature space is identical to the "embedding space." The techniques herein are thus useful in this setting where the sheer amount of these interpretable features is such that understanding the main traits of a given entity or group of entities is not straightforward.

A second component of architecture 400 may be a sparse dictionary learner 406, in various embodiments. Generally, learner 406 may apply dictionary learning and sparse coding, in an attempt to find a decomposition of each state vector $x_i$ of model 404 as a linear combination of basis vectors $a_i$, such that $X=D*A$, where X and A are constructed by stacking $x_i$ and $a_i$, respectively. Intuitively, the vectors $a_i$ represent the "essential" behaviors from which every other behavior is derived in the embedded space for the entity in the network. As such, each basis vector $a_i$ should be interpretable, especially if it is enforced that D is non-negative, and one should be able to assign descriptions to these states. The ability to interpret these basis vectors is one of the key functionalities of the techniques herein.

Said differently, the operations of sparse dictionary learner 406 may be viewed an extra step of representation learning, on top of the embedding of model 404, which is allows for the targeting of different kind of tradeoff between overall reconstruction accuracy and properties of the representation. In particular, some reconstruction accuracy may be scarified in architecture 400 to achieve the objective of decomposing embedded states into a superposition of a limited number of code words/basis vectors.

A further component of architecture 400 may be an interpretation mapper 410 that, given a particular state vector 408 from model 404, outputs a label 412 for the state that can be provided to a user interface (e.g., for review by an administrator). Generally, label 412 may be human-readable, meaning that the associated observations may be mapped/translated into words/descriptions for review by the user of the user interface.

In some aspects, interpretation mapper 410 may generate a "sketch" of the behavior represented by a given basis vector $a_i$. This sketch can be obtained in different manners by mapper 410 using a selection of sample entities (e.g., sets of time series and/or static feature vectors) that use $a_i$ in their decompositions. As sparse coding decompositions are not unique in general, various multiple-restarts techniques can be used by mapper 410, such as by selecting entities and having the projection onto $a_i$ be the largest amongst all code words. In other cases, mapper 410 may perform multiple steps of Orthogonal Matching Pursuit or another similar approach.

In one embodiment, mapper 410 may use these sample time series or feature vectors to train a classifier to discriminate elements using the code word/basis vector $a_i$ preeminently from those that do not. Note that such a classifier is not exposed to the embedded representations of the entities in model 404, but only to the interpretable input features to model 404. In other words, a goal of mapper 410 may be to "explain," using the interpretable input features to model 404, what kind of entities use a given code word in the embedding space. For example, a low capacity classifier, such as a low-depth tree, can be used to try and identify simple interpretable rules that characterize entities using each code word/basis vector. In the context of Wi-Fi APs, e.g., this may allow mapper 410 to learn rules that a given code word/basis vector in the embedding space corresponds to "air quality<80" or "clients>1,000."

In another embodiment, mapper 410 may present a few of the most interpretable input features (e.g., either according to a pre-defined rule or based on rating by the user/operator) to a user via a user interface for multiple sample entities using $a_i$. In turn, the user may be requested to label them, such as by describing them with words or short sentences. Additionally, the user may decline to label/describe the sketch if he or she considers it not sufficiently interpretable. Mapper 410 may repeat this process across many users and store their descriptions in a database. In one embodiment, mapper 410 may use active learning strategies to decide which user to query, and at which rate, based on the number and the consistency of feedback already received.

Interpretation mapper 410 may also determine whether a particular basis vector $a_i$ is interpretable enough to be used for purposes of labeling a state vector $x_j$. When using discriminative classification to form the sketch, tradeoffs may be made based on the different kinds of classification error. For example, if the classification has high error, mapper 410 may determine that $a_i$ is not suitably interpretable (e.g., by a human user).

In the case where mapper 410 relies on user input to describe the basis vectors, mapper 410 may instead verifies that enough descriptions have been provided (e.g., if not too many users have declined to label) and whether the agreement among users is sufficient (e.g., whether the user used similar words in their descriptions). Descriptions that reach the quorum are then assigned by mapper 410 to $a_i$, which is promoted to an interpretable basis vector. However, if no label reaches the quorum, mapper 410 may drop $a_i$ from further analysis and, in turn, evaluate a new basis vector using the techniques above.

In cases in which mapper 410 relies on one or more users to provide descriptive words (e.g., as raw strings), this alone may yield poor results if the users are inconsistent in their word choices. Thus, in some embodiments, mapper 410 may use machine learning to learn notions such as "large vs. small," "unusual vs. similar," regarding the input features. For instance, mapper 410 may deem a description of "high RF quality" equivalent to the description "radio is good." This pre-processing stage can resort to a pre-determined, co-occurrence model, or can learn as the system goes by asking users for additional feedback as to which descriptions are conceptually similar. For example, mapper 410 may use techniques such as word2vec (e.g., a two-layer neural network that processes text) to define a distance between user-defined descriptions. Mapper 410 can then use this distance with a clustering technique to cluster similar descriptions together and then use a single description per cluster of user descriptions when looking for quorum.

Finally, mapper 410 may use the human-readable interpretations from above to generate label 412 for state vector 408 (e.g., a state vector $x_j$). For example, using the basis vectors that are deemed interpretable, mapper 410 may generate a label for $x_j$ based on the descriptions of the active basis vectors. For instance, if $x_j$ can be decomposed into $2*a_2 + 0.5*a_{15} + 4.5*a_{19}$, where $a_2$ and $a_{19}$ are interpretable with interpretations/descriptions of "poor air quality" and "many clients," respectively, the generated label 412 for $x_j$ would be "bad air quality and many clients."

Figure 5:
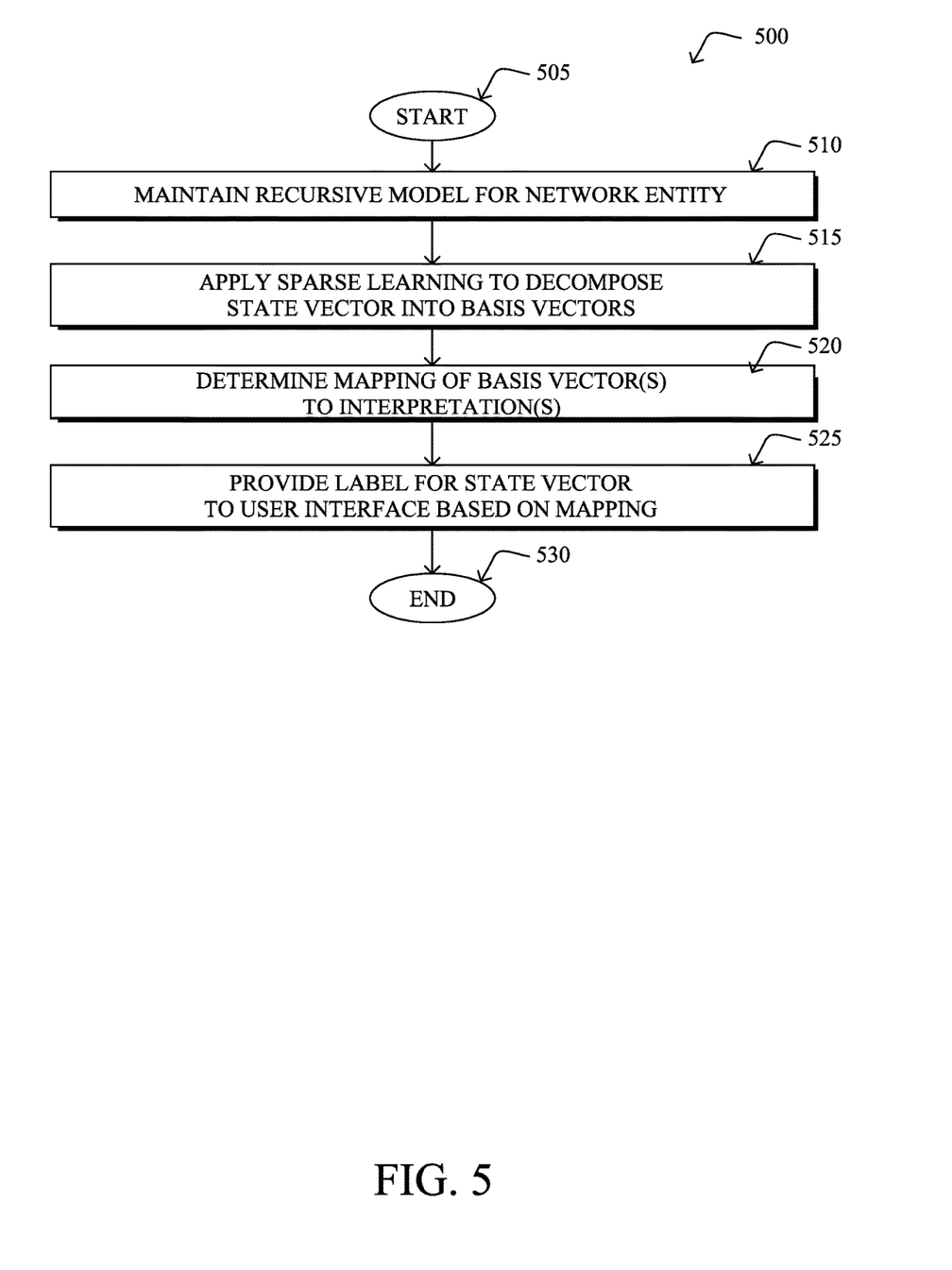
FIG. 5 illustrates an example simplified procedure for performing sparse coding of hidden states for explanatory purposes.

FIG. 5 illustrates an example simplified procedure for performing sparse coding of hidden states for explanatory purposes, in accordance with one or more embodiments described herein. For example, a non-generic, specifically configured device (e.g., device 200) may perform procedure 500 by executing stored instructions (e.g., process 248). For example, the executing device may be part of a cloud-based network assurance system that oversees the operations of the network. The procedure 500 may start at step 505, and continues to step 510, where, as described in greater detail above, the device may maintain a machine learning-based recursive model that models a time series of observations regarding a monitored entity in the network. For example, the model may be a recursive model (e.g., an RNN, etc.) that models an entity in the network such as an AP, router, switch, controller, or the like.

At step 515, as detailed above, the device may apply sparse dictionary learning to the recursive model, to find a decomposition of a particular state vector of the recursive model. In general, the decomposition of the particular state vector may comprise a plurality of basis vectors. For example, the device may apply sparse coding techniques to the state vector(s) of the recursive model for the entity in the network, to identify the underlying basis vectors for the state vector(s).

At step 520, the device may determine a mapping between at least one of the plurality of basis vectors for the particular state vector and one or more human-readable interpretations of the basis vectors, as described in greater detail above. In some cases, the device may obtain the human-readable interpretations by polling one or more users (e.g., via user interfaces) for word descriptions of the basis vector(s). In one embodiment, the device may then apply clustering to the descriptions, to obtain a consensus or finalized description. In other embodiments, the device may perform the mapping using a classifier on the observations. For example, such a classifier may only be exposed to the input features/observations of the recursive model and output descriptions, accordingly.

At step 525, as detailed above, the device may provide a label for the particular state vector to a user interface. Generally, the label is based on the mapping between the at least one of the plurality of basis vectors for the particular state vector and the one or more human-readable interpretations of the basis vectors. For example, one label may indicate that a given AP has a large number of attached endpoints and has bad RF properties. In other words, the label may be a textual description of the state vector that is human-readable and based on the descriptions/interpretations mapped to the basis vectors of the state vector. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, disclose a mechanism to describe the complex dynamics of network elements such as access points, routers, wireless controllers, and switches using simple labels that can be read and interpreted by a human user. In some aspects, the techniques may also leverage active learning, to reduce the need to query many users or querying the users too often.

While there have been shown and described illustrative embodiments that provide for performing sparse coding of hidden states for explanatory purposes, it is to be understood that various other adaptations and modifications may be made within the spirit and scope of the embodiments herein. For example, while certain embodiments are described herein with respect to using certain types of machine learning models, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a device in a network, a machine learning-based recursive model that models a time series of observations regarding a monitored entity in the network;
   applying, by the device, sparse dictionary learning to the recursive model, to find a decomposition of a particular state vector of the recursive model, wherein the decomposition of the particular state vector comprises a plurality of basis vectors;
   determining, by the device, a mapping between at least one of the plurality of basis vectors for the particular state vector and one or more human-readable interpretations of the basis vectors;
   providing, by the device, a label for the particular state vector to a user interface, wherein the label is based on the mapping between the at least one of the plurality of basis vectors for the particular state vector and the one or more human-readable interpretations of the basis vectors;
   determining, by the device, that a particular one of the basis vectors does not have a human-readable interpretation based on the mapping; and
   ignoring, by the device, the particular basis vector when generating the label for the state vector.

2. The method as in claim 1, wherein the monitored entity comprises at least one of:
   a router in the network, a switch in the network, a wireless controller in the network, or an access point in the network.

3. The method as in claim 1, wherein determining the mapping between the at least one of the plurality of basis vectors for the particular state vector and the human-readable interpretations of the basis vectors comprises:
   receiving, at the device, one or more descriptions for the plurality of basis vectors from the user interface; and
   using, by the device, the one or more descriptions to form the human-readable interpretations of the basis vectors.

4. The method as in claim 3, wherein using the one or more descriptions to form the human-readable interpretations of the basis vectors comprises:
   clustering, by the device, two or more of the descriptions into a human-readable interpretation.

5. The method as in claim 1, wherein determining the mapping between at least one of the plurality of basis vectors for the particular state vector and the human-readable interpretations of the basis vectors comprises:
   applying, by the device, a machine learning-based classifier to the observations.

6. The method as in claim 5, wherein the classifier is trained to identify entities in the network that are associated with a particular one of the basis vectors.

7. The method as in claim 1, wherein the machine learning-based recursive model comprises a recurrent neural network (RNN).

8. The method as in claim 1, wherein the device is part of a cloud-based network assurance system.

9. An apparatus, comprising:
   one or more network interfaces to communicate with a network;
   a processor coupled to the network interfaces and configured to execute one or more processes; and
   a memory configured to store a process executable by the processor, the process when executed operable to:
   maintain a machine learning-based recursive model that models a time series of observations regarding a monitored entity in the network;
   apply sparse dictionary learning to the recursive model, to find a decomposition of a particular state vector of the recursive model, wherein the decomposition of the particular state vector comprises a plurality of basis vectors;
   determine a mapping between at least one of the plurality of basis vectors for the particular state vector and one or more human-readable interpretations of the basis vectors; and
   provide a label for the particular state vector to a user interface, wherein the label is based on the mapping between the at least one of the plurality of basis vectors for the particular state vector and the one or more human-readable interpretations of the basis vectors.

10. The apparatus as in claim 9, wherein the monitored entity comprises at least one of: a router in the network, a switch in the network, a wireless controller in the network, or an access point in the network.

11. The apparatus as in claim 9, wherein the apparatus determines the mapping between the at least one of the plurality of basis vectors for the particular state vector and the human-readable interpretations of the basis vectors by:
receiving one or more descriptions for the plurality of basis vectors from the user interface; and
using the one or more descriptions to form the human-readable interpretations of the basis vectors.

12. The apparatus as in claim 11, wherein the apparatus uses the one or more descriptions to form the human-readable interpretations of the basis vectors by:
clustering two or more of the descriptions into a human-readable interpretation.

13. The apparatus as in claim 9, wherein the apparatus determines the mapping between at least one of the plurality of basis vectors for the particular state vector and the human-readable interpretations of the basis vectors by:
applying a machine learning-based classifier to the observations.

14. The apparatus as in claim 13, wherein the classifier is trained to identify entities in the network that are associated with a particular one of the basis vectors.

15. The apparatus as in claim 9, wherein the machine learning-based recursive model comprises a recurrent neural network (RNN).

16. The apparatus as in claim 9, wherein the apparatus is part of a cloud-based network assurance system.

17. A tangible, non-transitory, computer-readable medium storing program instructions that cause a device in a network to execute a process comprising:
maintaining, by the device, a machine learning-based recursive model that models a time series of observations regarding a monitored entity in the network;
applying, by the device, sparse dictionary learning to the recursive model, to find a decomposition of a particular state vector of the recursive model, wherein the decomposition of the particular state vector comprises a plurality of basis vectors;
determining, by the device, a mapping between at least one of the plurality of basis vectors for the particular state vector and one or more human-readable interpretations of the basis vectors;
providing, by the device, a label for the particular state vector to a user interface, wherein the label is based on the mapping between the at least one of the plurality of basis vectors for the particular state vector and the one or more human-readable interpretations of the basis vectors;
determining, by the device, that a particular one of the basis vectors does not have a human-readable interpretation based on the mapping; and
ignoring, by the device, the particular basis vector when generating the label for the state vector.

18. The tangible, non-transitory, computer-readable medium as in claim 17, wherein the monitored entity comprises at least one of: a router in the network, a switch in the network, a wireless controller in the network, or an access point in the network.

* * * * *

UNITED STATES PATENT AND TRADEMARK OFFICE
CERTIFICATE OF CORRECTION

PATENT NO. : 10,212,044 B2  
APPLICATION NO. : 15/466969  
DATED : February 19, 2019  
INVENTOR(S) : Grégory Mermoud et al.

Page 1 of 1

It is certified that error appears in the above-identified patent and that said Letters Patent is hereby corrected as shown below:

In the Specification

Column 7, Line 56, please amend as shown:  
AP1 through nth access point, APn) through which endpoint Column 8, Line 3, please amend as shown:  
AP1 through nth access point APm) that provide connectiv- Column 12, Line 57, please amend as shown:  
learning, on top of the embedding of model 404, which Signed and Sealed this  
Twenty-eighth Day of January, 2020

Andrei Iancu  
*Director of the United States Patent and Trademark Office*